Nov. 27, 1928.

L. BENSON 1,693,571

SHOCK ABSORBER

Filed June 9, 1926　　2 Sheets-Sheet 2

INVENTOR
Lester Benson,
BY
ATTORNEY.

Patented Nov. 27, 1928.

1,693,571

UNITED STATES PATENT OFFICE.

LESTER BENSON, OF WILLOUGHBY, OHIO, ASSIGNOR TO THE GLENN L. MARTIN CO., OF CLEVELAND, OHIO, A CORPORATION OF OHIO.

SHOCK ABSORBER.

Application filed June 9, 1926. Serial No. 114,755.

My invention relates to improvements in shock absorbers, and more particularly to the object of providing means for protecting the elastic members thereof and lengthening the life of such shock absorbers, while incidentally augmenting their function.

The style of shock absorber herein shown and to which my improvement primarily is applied, is a type of shock absorber associated with the landing gears of airplanes, wherein elastic rubber cords have been found to be the most advantageous for the purpose in hand.

The resilient member or members of such shock absorbers comprise a plurality of long rubber strands exteriorly bound together by a suitable woven covering of fabric or the like. As with all rubber articles, however, these cords are subjected to rapid deterioration unless suitable means are provided for protecting the same, such as I have herein shown.

It is apparent that the protective means normally must be of yielding character in order to accommodate the varying tension of the rubber cords. Accordingly, I have devised a suitable enclosing shell or case adapted, in association with the mounting thereof, completely to enclose and protect the rubber cords while expanding and contracting in unison therewith.

The features of my invention may best be explained in connection with the accompanying drawings, wherein.

Throughout the several figures of the drawings, I have employed the same character of reference to indicate similar parts.

Figure 4:
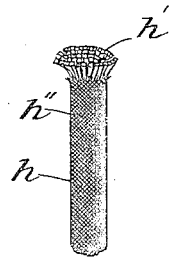
Fig. 4 is a fragmentary view of a section of the elastic cord employed as the primary resilient member for the shock absorber.

At the lower end of the landing gear strut $a$, there is provided the diagonal forked bracket $b$ for accommodating the movement of the axle $c$, intermediately shown in cross section. The bar $d$ provided at the lower end of the bracket, is secured in place by the transverse bolts $d'$. It accommodates the lower terminal spools $e$ of the shock absorber units and intermediately forms a stop for said axle. Retaining members $e'$, $e'$, are provided at the outer ends of the bar $d$ for accommodating the covered elastic cord, a section of which is shown in Fig. 4. The axle $c$ carries a riser $f$ from which the upper spools $g$, $g$, of the shock absorber units are terminally supported, as best shown upon the left, Fig. 1.

As stated above, the best known resilient element for shock absorbers of this class is a composite rubber elastic cord $h$, comprising a plurality of rubber strands $h'$ closely bound together by a woven fabric cover $h''$, which is shown in Fig. 4 terminally stripped away from the inclosed rubber strands. In constructing a shock absorber unit, one end of this cord is suitably anchored to the spool $g$ and the length of rubber cord $h$ is wound from the upper to the lower spool until their capacity is reached. The free end of the cord $h$ is then anchored to one of the spools, forming five complete resilient members duplicated on either side of the supporting axle, in the instant embodiment by which the weight of the airplane is carried.

Figure 1:
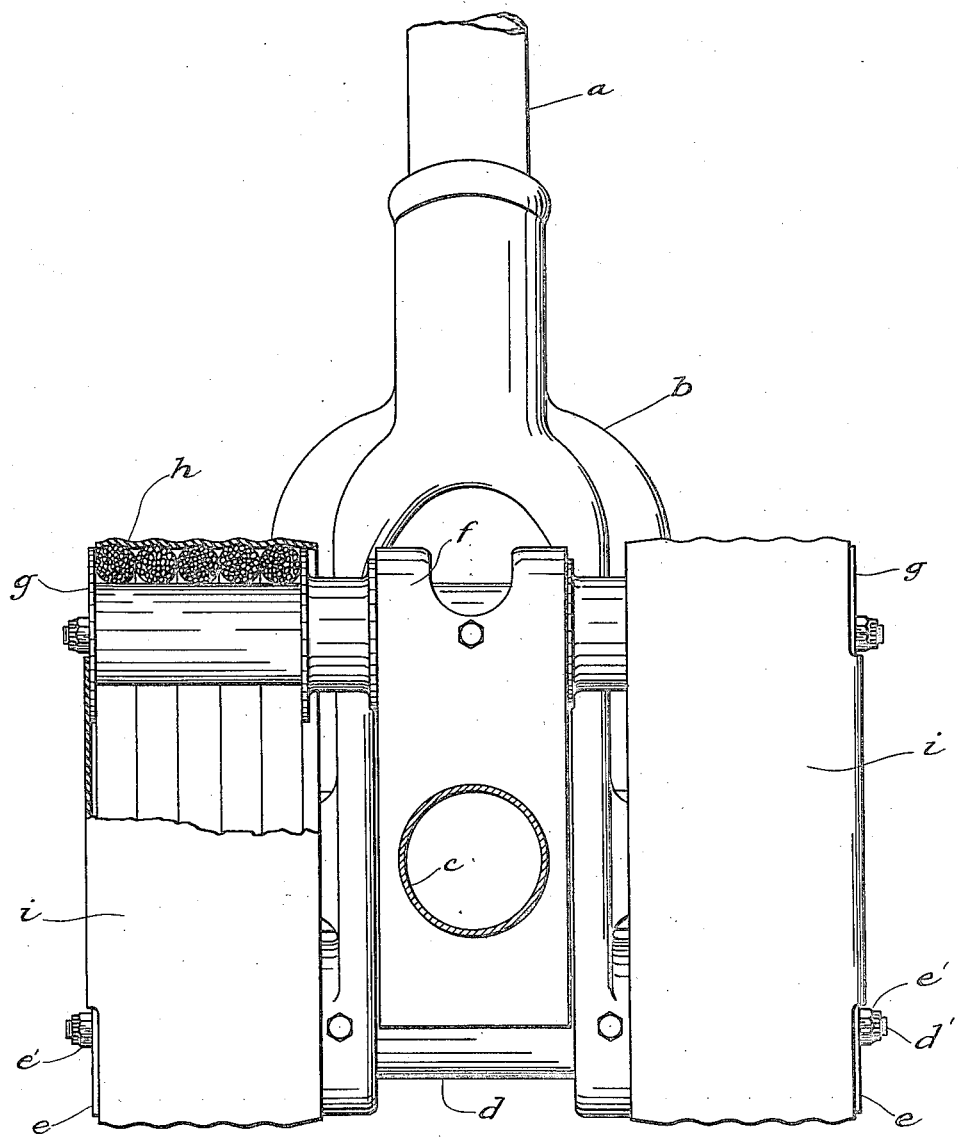
Figure 1 is a fragmentary elevation of a shock absorber unit, partially in section, adapted for the landing gear of an airplane illustrated in connection with the members thereof.
Figure 2:
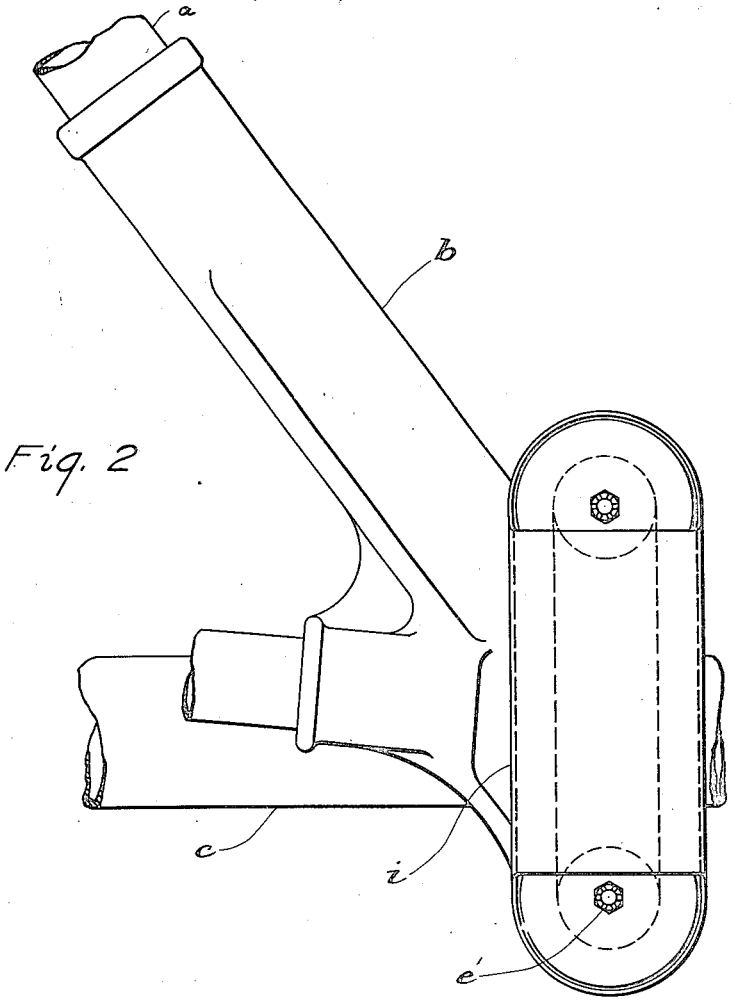
Fig. 2 is a view thereof in front elevation.
Figure 3:
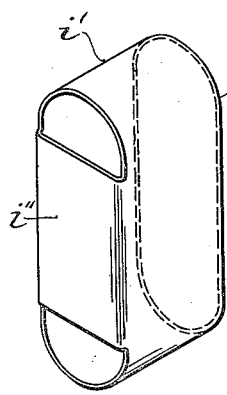
Fig. 3 is an isometric view of one of the elastic covers associated with the shock absorber.

In order effectively to protect the rubber members of each resilient unit, I provide a heavy-walled rubber case $i$ shown in a preferred form, Fig. 3. This cover or closure preferably is made smaller than the shock absorber unit in its normally contracted relation in order that it will have inherent tension to maintain its protective position as shown in Figs. 1 and 2, under all conditions. The particular style of closure comprises an elongated endless body wall $i'$, united by the transverse member $i''$ at one side thereof, adapted completely to cover the spools and stranded rubber cords exteriorly, while accommodating itself to the relative movement of the spools during the take-off or landing of the plane.

By making the rubber covering or closure of sufficiently heavy gauge sheet rubber, it is obvious that the resilient qualities of the stranded rubber cord or cords may be materially augmented, in addition to protecting the same from deterioration. These closures or covers, obviously, may be readily replaced as occasion demands.

It should be understood that I do not desire to limit myself to the precise details hereinbefore explained with respect to the several members of the shock absorber unit, including the particular type of elastic cover, since these may be varied to meet different requirements of use.

Having now described a preferred embodiment of my invention, I desire to claim the same, together with such modifications as may be made by one ordinarily skilled in the art, as follows:

1. In a shock absorber of the class described, the combination with the supporting and supported members thereof, comprising opposing spools, of a plurality of rubber strands extending from spool to spool and operatively connecting the same to prevent the transmission of shock from the one to the other, and a replaceable rubber closure for said spools and rubber strands protectively inclosing the same and augmenting the shock absorbing quality, substantially as set forth.

2. In a shock absorber, the combination with paired opposing spools, of stranded rubber members disposed thereon and wound from spool to spool for operatively connecting them in shock-absorbing relation, and heavy-walled rubber closures disposed about the stranded rubber members in protective relation, substantially as set forth.

In testimony whereof I do now affix my signature.

LESTER BENSON.